Feb. 20, 1968

H. B. SAPP, JR., ETAL 3,369,468

CAMERA WITH MULTILAMP PHOTOFLASH MEANS

Filed June 30, 1965

HUBERT B. SAPP JR.
EDMUND F. DEFFENBAUGH
ROY E. MERKEL
INVENTORS

BY

ATTORNEYS

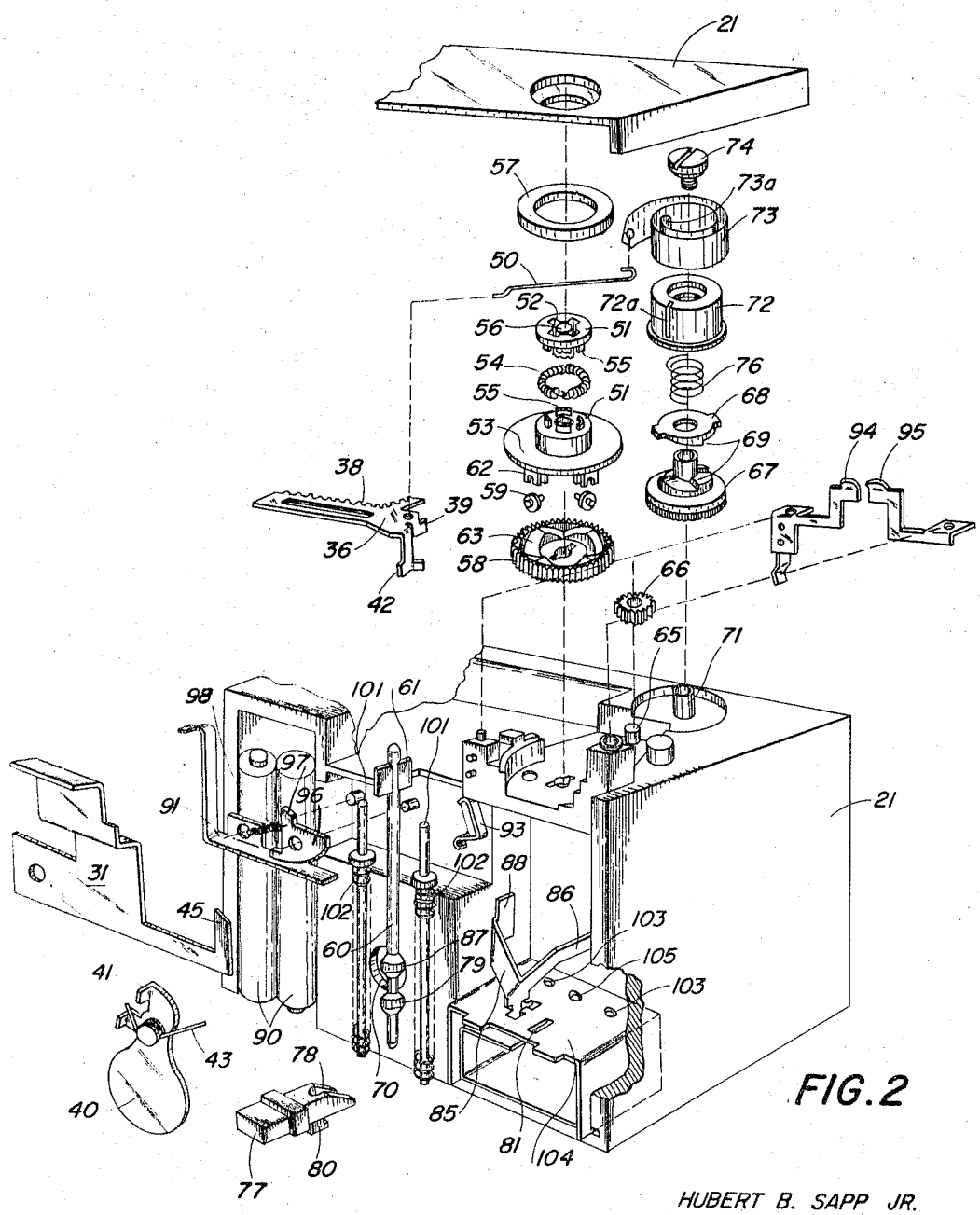

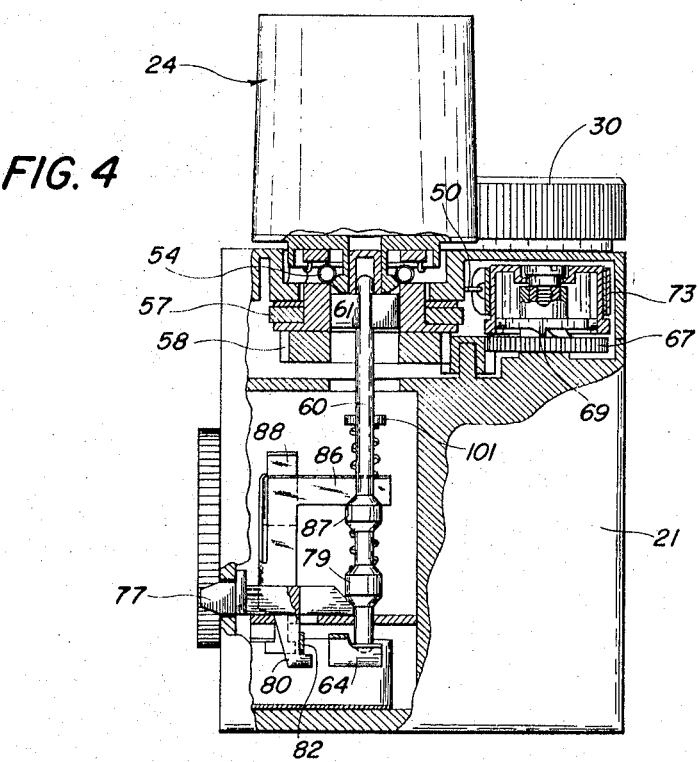
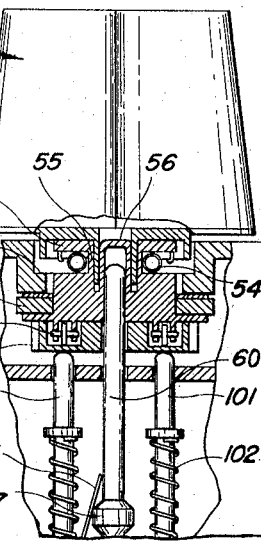
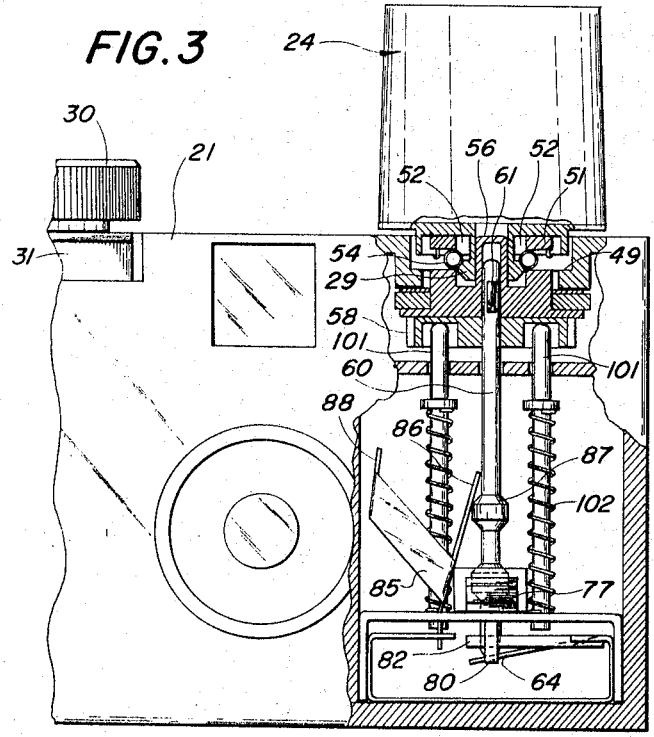
HUBERT B. SAPP JR.
EDMUND F. DEFFENBAUGH
ROY E. MERKEL
INVENTORS

HUBERT B. SAPP JR.
EDMUND F. DEFFENBAUGH
ROY E. MERKEL
INVENTORS

BY
ATTORNEYS

United States Patent Office 3,369,468
Patented Feb. 20, 1968

3,369,468
CAMERA WITH MULTILAMP
PHOTOFLASH MEANS
Hubert B. Sapp, Jr., Edmund F. Deffenbaugh, and Roy
E. Merkel, Rochester, N.Y., assignors to Eastman
Kodak Company, Rochester, N.Y., a corporation of
New Jersey
Filed June 30, 1965, Ser. No. 468,211
8 Claims. (Cl. 95—11.5)

ABSTRACT OF THE DISCLOSURE

A photographic still camera having a rotatable multilamp photoflash package receiving socket that is coupled to the camera shutter mechanism to rotate the socket and package during resetting of the shutter for successively placing fresh lamps in the camera flash circuit with successive camera operations. A spring motor drive to effect shutter resetting and socket rotation is described.

---

This invention relates to flash photography and more particularly, to photographic still cameras with built-in photoflash systems for accepting multilamp photoflash packages.

There has been developed a disposable multilamp photoflash unit or package having a plurality of photoflash lamps and disclosed, for example, in applications for United States Letters Patent, Ser. No. 417,914, now Patent No. 3,327,105, and Ser. No. 417,913, filed Dec. 14, 1964, in the name of Franklin D. Kottler et al. and Dean M. Peterson et al., respectively. The present invention comprises means in a photographic still camera having a socket for accepting such a multilamp package and a mechanism for automatically indexing the package to successively place fresh or unfired lamps in the camera flash circuit with successive operations of the camera. As such, a means according to the present invention is particularly suited to a motor driven camera and includes socket means to detachably receive a multilamp package with one of the lamps in the flash circuit, and means operatively connected to the shutter mechanism for automatically indexing the package by rotation to place a fresh lamp in the flash circuit after the prior flash exposure has been taken.

An important object of the present invention resides, therefore, in the provision of a new and improved photographic still camera designed to accept and automatically index a multilamp photoflash package.

Yet another object resides in the provision of a multilamp photoflash package indexing mechanism particularly suitable for use in motor driven cameras.

Still another object of the present invention resides in the provision of a multilamp package and receiving socket drive mechanism in a camera which is operatively connected to the shutter mechanism and is energized during film wind and resetting of the shutter mechanism to index the multilamp package by rotation and thereby place a fresh lamp in the flash circuit.

These and other objects and advantages will become more apparent in the course of the following description, the accompanying drawing forming a part thereof and wherein:

FIG. 2 is an exploded view showing elements of the present invention together with associated camera elements;

FIG. 3 is a partial front view of the camera with a sectional view of the receiving socket arrangement taken on line 3—3 of FIG. 1;

FIG. 4 is a side sectional view taken on line 4—4 of FIG. 6;

FIG. 5 is a partial front view showing one stage of operation, taken on line 5—5 of FIG. 8.

Figure 1:
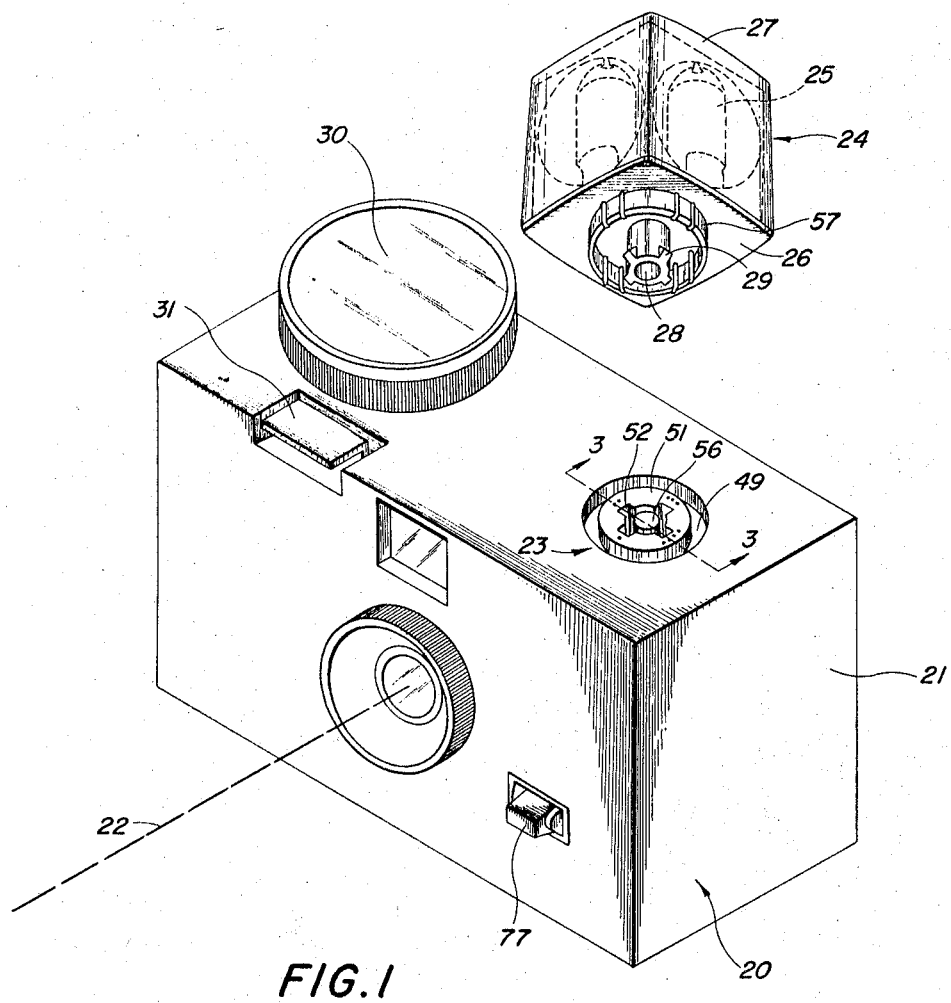
FIG. 1 is a perspective view of a photographic still camera embodying the present invention, together with a suitable multilamp photoflash package.

With reference to FIG. 1, there is shown a photographic roll film still camera 20 comprising a light tight camera body 21 having a picture-taking or lens axis 22 on which are located the usual focusing lens and film plane for holding a frame of a roll of photosensitive film (not shown). The shutter mechanism and diaphragm, cooperating with the present invention and to be described in more detail, are also positioned to be in operative relationship with the axis 22 to expose to frame of film located at the film plane.

Accessibly located at the top wall of the camera body 21 is a multilamp photoflash package receiving socket 23 designed to receive a disposable multilamp photoflash unit or package 24. The package 24 is more fully described in the above listed U.S. applications. Briefly, however, the package 24 includes a plurality (four) of photoflash lamps 25 (AG-type) ordinately mounted in a vertical position about a vertical axis of rotation on a substantially square base 26, with the lamp lead-in wires extending below the base 26 as shown. Individual light reflective surfaces (reflectors) are positioned behind each lamp 25 and an overall light transmitting protective cover 27 is provided. The base 26 defines four lamp sides and includes a depending center post 28 of tubular shape with four engagement or retaining lugs 29, each extending radially outwardly toward a respective lamp side and having upper and lower ramped surfaces. The socket 23 defines an opening, corresponding to the cross-sectional shape of the post 28 and lugs 29 as shown, for receiving the package 24 in any one of four predetermined positions in which one of the lamps 25 faces forwardly, i.e., in the direction of the picture-taking axis 22 from the camera 20 as shown.

Film wind and shutter mechanisms

To wind the roll film along the film plane for positioning successive frames of film on the film plane, there is provided an accessible film winding spring control knob 30. The control knob 30 energizes a spring driven motor drive to wind film and set the camera shutter operating mechanism, which is released by an accessible body release member 31 to expose the positioned film frame by admitting light along the axis 22 for a predetermined period of time.

Figure 6:
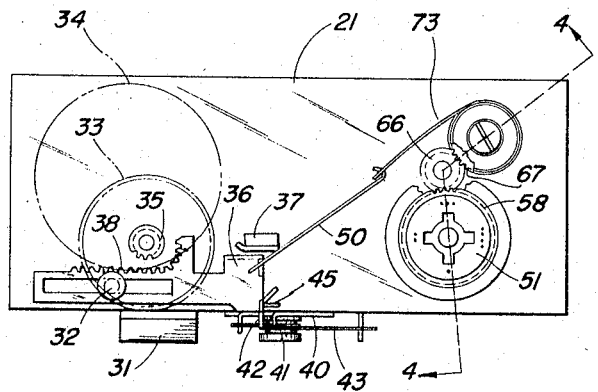
FIGS. 6 through 8 are top views showing various stages of camera operation according to this invention.
Figure 7:
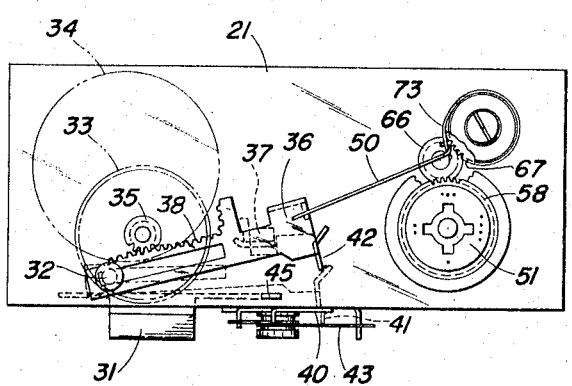
Figure 8:
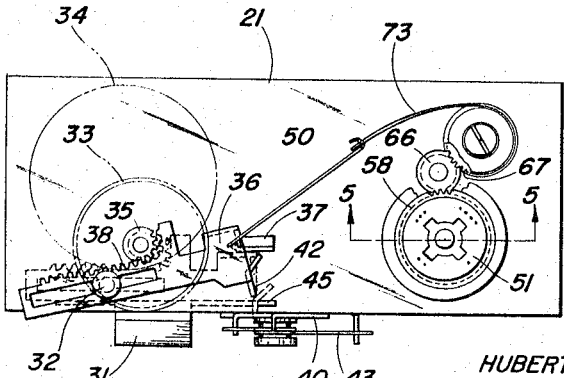

A film winding mechanism suitable for use with the present invention shown is disclosed in more detail in U.S. patent application Ser. No. 257,514, filed Feb. 11, 1963, now U.S. Patent No. 3,232,196. Referring to FIGS. 6–8, the mechanism is schematically shown to include a film take-up spring drive motor 34 rotatable through a suitable gearing arrangement as shown the application Ser. No. 257,514 to selectively wind film onto a take-up reel after each exposure. The spring motor 34 also operates through coaxial gears 33–35 which act to set the shutter mechanism as the film is being wound.

A suitable shutter mechanism comprises a shutter driver 36 which is movable about a pivot pin 32. A toothed rack section 38 on the driver 36 is engaged by gear 35 whenever the winding motor 34 is operated to move the driver 36 to the position shown in FIG. 6 against the bias of a strong operating spring assembly 50–73, which serves an additional purpose to be described in more detail. The shutter itself comprises a pivotable impact shutter blade 40 having an ear 41 in the path of a finger 42 on the driver 36. A lighter spring 43 normally holds the blade 40 in a position covering the exposure aperture, and a latch 45 on the body release 31 is normally in the path of movement of finger 42 to prevent shutter operation until the body release 31 is depressed. Upon release of the shutter driver 36 by depressing the body release 31 against a retaining spring (not shown), to move latch 45 out of the path of movement of finger 42, the action of spring assembly 50–73 causes the driver 36 to move rapidly to the right in a direction controlled by an island 37 (FIG. 6) to the position shown in dotted lines in FIG. 7. This motion causes finger 42 to strike ear 41 and move the shutter blade 40 off the exposure aperture against the bias of spring 43 for a predetermined period of time, the shutter blade 40 returning to cover the aperture by operation of the spring 43.

To return the driver 36 to its initial position by the motor drive after each exposure as thus described, the spring assembly 50–73 causes the driver 36 to move around island 37 to the position shown in solid lines in FIG. 7, thereby enabling rack 38 to engage gear 35, which is being driven by the spring motor, to return driver 36 through the positions shown in FIG. 8 to the cocked position shown in FIG. 6.

*Lamp socket assembly*

Referring now to FIG. 3, the unit receiving socket 23 comprises a socket receiver 51 defining the upper access opening 52 for receiving the package base 26. The intermediate portion of the receiver 51 defines recessed ribs 55 about which is positioned an annular helical or garter spring 54. A center stabilizing spindle 56 within the ribbing space is positioned to be insertable into the hollow center post 28 of a multilamp package. When the post 28 of a package is inserted into the socket opening 52, the retaining spring 54 engages the four retaining lugs 29 on the upper ramped surfaces to releasably retain the package in the socket. During the insertion, the spring 54 is expanded outwardly by the lower ramped surfaces which extend outside ribs 55, until the package is fully seated, and the spring 54 then returns to engage the upper ramped surfaces.

An annular thrust bearing or washer 57 of low friction material is positioned between the lower portion 53 of receiver 51 and the camera body 21 to permit ready rotation of receiver 51 relative to the camera body. The upper portion of socket receiver 51 and camera body 21 define an annular groove 49 which receives the contact ring 57 of the inserted package 24.

A vertically slideable control pin 60, mounted axially below the socket base 53, includes a wing top 61 which extends into the base 53 and is exposed through slots in the center stabilizing spindle 56. The upper surface of the wing 61 is engageable by the inserted center post 28. The socket receiver 51 defines an upper bearing surface for the control pin 60, and a bracket 104, which includes a bore hole 105 for receiving the lower portion of pin 60, defines a lower bearing surface. Both bearing surfaces and all slots in intermediate parts permit vertical sliding of pin 60, as well as rotation of pin 60 with receiver 51.

Engageable with the lower end of pin 60 is a plate spring 64 which urges the pin 60 upwardly for engagement with center post 28. However, spring 64 is weaker than retaining springs 54 so that the spring 64 does not automatically release an inserted unit from the retaining spring 54.

In order to eject an inserted package from the receiving socket, there is provided an accessible ejector button 77 having a ramp surface 78 cooperating with a collar 79 on pin 60. The button 77 slides along bracket 62 by a lug 80 in a slot 81 in the bracket 104, and a spring 82 acts on the inner edge of lug 80 to urge the button 77 outwardly. Pressing the button 77 manually against the bias of spring 82 causes the pin 60 to be moved upwardly by engagement of ramp 78 with collar 79, thereby causing the wing top 61 to push the inserted package out of the socket receiver 51.

According to this embodiment, the shutter mechanism described above may also be adjusted for either flash operation or daylight operation, depending upon the presence of a package in the receiving socket. As shown here, there is provided a bell spring lever 85 pivoted in the bracket 104 and having one end 86 biased toward and engageable with a step portion 87 on the control pin 60. The other end of the lever 85 defines an inertia stop 88 which may be selectively movable into the path of movement of ear 41 of shutter blade 40 to arrest movement of the shutter blade after actuation and thereby shorten the opening time of the shutter. This adjustment mechanism, as well as the ejection mechanism, is shown in U.S. application Ser. No. 458,015, filed May 24, 1965, in the name of Paul J. Ernisse et al.

As described in the Ernisse application, the engagement end 86 engages the step portion 87 when no package is inserted and the control pin is in its uppermost position, thereby limiting shutter speed to a speed suitable for daylight operation, say $1/80$ sec. When a package is inserted into the socket and the control pin 60 is caused to move down, the step portion moves out of the path of end 86 and the bell lever 85 is moved by its bias to the right (FIG. 3) to move the stop 88 out of the shutter blade path, thereby enabling the shutter blade to move its full stroke and to operate at a slower speed suitable for flash operation, say $1/40$ sec.

*Flash operation*

To provide for flash pictures, a lamp firing circuit is built into the camera body. The circuit comprises a suitable source of electric potential such as batteries 90, one terminal of which is connected to camera ground and the other terminal of which is connected to a resilient contact arm 91 forming part of a flash synchronizing switch. The contact arm 91 is operatively engageable with a fixed contact 93, which in turn is electrically connected to an exposed lamp terminal 94. Lamp terminal 94 physically engages one lead-in wire of the forward-facing lamp 25 of an inserted package 24, whereas the other lead-in wire is engaged by a second lamp terminal 95 connected to camera ground to complete the circuit. The terminals 94, 95 are positioned in the annular groove 49.

Flash is synchronized with camera exposure by a pivoted control cam 96 having a control end 97 normally in the path of movement of finger 42 by the bias of a spring 98. When the body release 31 is depressed, the movement of the shutter driver 36 causes the cam to rotate clockwise (FIG. 2) until contact arm 91 engages contact 93 to complete the lamp firing circuit. Operation of the flash synchronizing circuit is more fully described in U.S. application Ser. No. 434,410, now Patent No. 3,318,217, filed Feb. 23, 1965, in the name of Paul J. Ernisse.

*Socket and lamp package indexing mechanism*

According to the invention, the package-receiving socket assembly 23 (and inserted multilamp package 24) is automatically indexed or repositioned by the spring motor drive through driver 36 to present a fresh lamp in the electrical firing circuit during film wind and resetting of the camera. In the embodiment shown, a spiral spring drive 73 is connected to driver 36 by a linking arm 50 to achieve this result. The drive spring 73, which is biased in a wound position on a rotatable drum 72, is unwound against the bias as film is wound and the shutter cocked or set. During exposure, the drive spring 73 acts to operate driver 36, and during film wind, the drive spring 73 is used to automatically rotate the socket 23 ninety degrees to place a subsequent fresh lamp 25 in the lamp circuit for the next exposure.

As a part of the indexing mechanism, a rotatable socket driving gear 58 is positioned below the receiver 51. Gear 58 includes an upper annular four wave cam surface 63 which is engageable by four equi-spaced rollers 59 mounted in supports 62 fixed to the bottom surface of receiver 51.

Referring to FIG. 2, an idler gear 66 mounted on a bearing pin 65 engages gear 58, and idler gear 66 is in turn engaged by a rotational drive gear 67.

Positioned above the gear 67 is a ratchet element 68 defining, with gear 67, ratchet teeth 69 which cause gear 67 to be rotated in one direction (counterclockwise as shown in FIG. 6) with element 68 and remain stationary whenever element 68 is rotating in the opposing direction. Ratchet element 68 is keyed to drum 72 for rotation therewith, and an intermediate spring 76 urges element 68 into operative engagement with gear 67. A screw 74 is provided to retain these parts.

The surface of drum 72 is provided with a slot 72a which fixes the inner end 73a of spring 73 to the drum, and the outer end 75 of spring 73 is operatively connected to driver 36 through wire 50.

Thus, movement of the driver 36 to the left by operation of gear 35 (FIGS. 7–8) causes the spring 73 to unwind and drum 72 to be rotated counterclockwise with simultaneous rotation of gear 58. Movement of the driver 36 to the right (FIGS. 6–7), by permitting spring 73 to rewind, causes drum 72 to rotate clockwise but without rotation of gear 58.

To ensure proper positioning of the socket assembly 23 during indexing, there is provided a pair of positioning pins 101 (FIG. 2), the upper ends of which engage a four wave cam surface on the lower side of gear 58, the lower cam surface corresponding with cam surface 63 but having a greater amplitude. The lower ends of pins 101 fit within openings 103 and are urged upwardly by relatively strong spiral springs 102. In this manner, whenever the driver 36 is moved to the position shown in solid in FIG. 8, the gear 58 is rotated at least beyond the bottom peak of the lower cam surface (FIG. 5), and the pins 101, being urged upwardly by strong springs 102, cause the gear 58 to continue rotating until a lower cam valley is reached with a corresponding lamp position facing forwardly.

Referring to FIGS. 3–5, space is provided below gear 58 so that an inserted package 24 may be grasped manually and rotated by hand through any one of the selected positions by movement of rollers 59 relative to cam surface 63. In this case, gear 58 will oscillate vertically during manual rotation, and pins 101 will ensure proper positioning. Similarly, camera operation is not prevented, even though the inserted package 24 is held stationary.

*Camera operation*

To operate the photographic camera according to the preferred embodiment with photoflash from a multilamp package, the base 26 of a multilamp flash unit 24 is placed in the socket assembly 23 with a fresh photoflash lamp facing forwardly in the direction of the picture-taking axis 22 and the lead-in wires of the lamp engaging the exposed flash circuit terminals 94, 95. This position is indicated by the single dot as shown in FIG. 6. As the unit base 26 is inserted, the control pin 60 is moved downwardly to automatically adjust the shutter speed for flash operation in the manner described.

Because of the motor drive, the camera is at this time otherwise ready for operation, motor 34 having wound the film and cocked the driver to the position shown in FIG. 6. The camera is now ready for operation with augmenting flash.

This is accomplished by aiming the camera in the desired direction and depressing the body release member 31 downwardly to a fully depressed position. This motion initially releases the finger 42 of the cocked driver 36, which rapidly strikes the shutter ear 41 by spring 73 to cause the shutter blade 40 to uncap the diaphragm aperture according to the predetermined time. Simultaneously, finger 42 also strikes the circuit switch cam ear 97 to complete the flash circuit and fire the lamp 25 in the circuit in timed relationship with the uncapping of the exposure aperture to take the "flash picture." This is shown by the dotted lines in FIG. 7. Immediately thereafter, spring 73 causes driver to be moved around the island 37 to the position shown in solid in FIG. 7, thereby engaging gear 35. During this entire motion, drum 72 is rotating clockwise but gear 58 (and socket assembly 23) remain stationary.

After the "flash picture" has been taken and the body release member 31 is being released to return to its original position by its retaining spring, spring motor 34 acts to move driver 36 back along island 37 to the left to the position shown in solid in FIG. 8. During this motion drum 72 and gear 58 are being rotated counterclockwise to bring the second position (shown by two dots) into the flash position, while pins 101 ensure a complete quarter turn rotation of gear 58. Since rollers 59 are in the valleys of cam surface 63, receiver 51 and package 24 are also rotated to place the second lamp in the flash circuit.

At this time, a fresh flash lamp 25 from the multilamp package is in the circuit and the camera is again ready for operation in the manner described. After all four lamps in the inserted package have been used, or whenever daylight operation of the camera is desired, the ejector button 77 is depressed to push the package 24 out of the socket assembly 23 and reset the shutter mechanism for daylight operation.

While the invention has been described by reference to a preferred embodiment showing an integrated camera mechanism, it is obvious that various modifications and changes in form can be resorted to without departing from the spirit of the invention or the scope of the subjoined claims.

We claim:

1. For use in flash photography, a photographic camera having a shutter operating mechanism with a movable shutter driver and motor means responsive to camera operation to set the shutter driver for a subsequent camera operation, the camera comprising:

a rotatable socket to detachably receive a unitary package containing a plurality of photoflash lamps, with a selected one lamp in a photoflash operating position to flash the lamp in timed relation with the shutter operating mechanism, and drive means connecting the socket to the shutter driver for movement therewith to rotate the socket and received package to place successive others of the lamps in the photoflash operating position during operation of the motor means to set the shutter driver.

2. For use in flash photography, a photographic camera having a shutter operating mechanism with motor means to set the mechanism for operation of the camera, the camera comprising:

a rotatable socket to detachably receive a unitary package containing a plurality of photoflash lamps, with a selected one lamp in a photoflash operating position to flash the lamp in timed relation with the shutter operating mechanism, and drive means interconnected to the shutter operating mechanism to rotate the socket and received package to place successive others of the lamps in the photoflash operating position during operation of the motor means to set the mechanism, the drive means comprising a rotatable drum and a spiral spring mounted on the drum with one end of the spring interconnected to the shutter operating mechanism, unwinding of the spring acting to rotate the socket and winding of the spring actuating the shutter operating mechanism.

3. For use in flash photography, a photographic camera having a shutter operating mechanism with motor means to set the mechanism for operation of the camera, the camera comprising:

a rotatable socket to detachably receive a unitary package containing a plurality of photoflash lamps, with a selected one lamp in a photoflash operating position to flash the lamp in timed relation with the shutter operating mechanism, and drive means interconnected to the shutter operating mechanism to rotate the socket and received package to place successive others of the lamps in the photoflash operating position during operation of the motor means to set the mechanism, the drive means comprising a gear having a wave cam surface, and pin means engaging the cam surface to position the socket in a selected position corresponding to the placing of lamp in the circuit.

4. A photographic camera comprising:

shutter means to make an exposure, a shutter driver movable to operate the shutter means, motor means to reset the shutter driver after each exposure, a rotatable socket to detachably receive a unitary package containing a plurality of photoflash lamps, a photoflash circuit with fixed terminal means to place a selected one lamp in the circuit and flash the lamp timed relation with the operating means, drive means to rotate the socket and received package to place successive others of the lamps in the circuit, and means linking the drive means to the shutter driver to actuate the drive means during the resetting of the shutter driver.

5. The camera according to claim 4 and further comprising pin means operatively controlling the socket to retain the socket in a selected one of a plurality of predetermined positions corresponding to the placing of the lamps in the circuit.

6. The camera according to claim 5 and further comprising roller means operative to overcome the pin means for socket rotation by hand.

7. A photographic camera comprising:

shutter operating means to make an exposure, means to reset the shutter operating means after each exposure, a rotatable socket to detachably receive a unitary package containing a plurality of photoflash lamps, a photoflash circuit with fixed terminal means to place a selected one lamp in the circuit and flash the lamp timed relation with the operating means.

drive means to rotate the socket and received package to place successive others of the lamps in the circuit, the drive means including a gear rotatable in a predetermined direction and ratchet means to rotate the gear in said direction, and means interconnected to the shutter operating means to actuate the drive means during the resetting of the shutter operating means, the actuating means comprising a rotatable drum operatively engaging the ratchet means and spring means acting on the drum to rotate the drum.

8. The camera according to claim 7 wherein the resetting means includes a motor driven film winding and shutter setting mechanism, and the interconnecting means comprises an arm operatively connected at one end to the end to the shutter drive and at the other end to the spring means.

References Cited

UNITED STATES PATENTS

| | | | |
|---|---|---|---|
| 2,804,537 | 8/1957 | Greger | 240—1.3 |
| 2,969,722 | 1/1961 | Schwartz | 95—31 |
| 3,080,804 | 3/1963 | Steineck | 240—1.3 X |
| 3,096,025 | 7/1963 | Prochnow | 240—1.3 |
| 3,139,805 | 7/1964 | Peterson | 95—11.5 |
| 3,244,087 | 4/1966 | Anderson et al. | 240—1.3 X |
| 3,263,068 | 7/1966 | Jakob | 240—1.3 |

NORTON ANSHER, *Primary Examiner.*

F. L. BRAUN, *Assistant Examiner.*